(12) United States Patent
Zhu et al.

(10) Patent No.: US 9,858,961 B2
(45) Date of Patent: Jan. 2, 2018

(54) READER DESIGN FOR INTERLACED MAGNETIC RECORDING

(71) Applicant: Seagate Technology LLC, Cupertino, CA (US)

(72) Inventors: Wenzhong Zhu, Apple Valley, MN (US); Kenneth A. Haapala, Plymouth, MN (US); Kaizhong Gao, North Oaks, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 323 days.

(21) Appl. No.: 14/724,523

(22) Filed: May 28, 2015

(65) Prior Publication Data

US 2016/0148645 A1 May 26, 2016

Related U.S. Application Data

(60) Provisional application No. 62/097,416, filed on Dec. 29, 2014, provisional application No. 62/083,696, filed on Nov. 24, 2014, provisional application No. 62/083,732, filed on Nov. 24, 2014.

(51) Int. Cl.
  *G11B 20/12* (2006.01)
  *G11B 5/012* (2006.01)

(52) U.S. Cl.
  CPC .......... *G11B 20/1217* (2013.01); *G11B 5/012* (2013.01); *G11B 2020/1238* (2013.01); *G11B 2020/1292* (2013.01)

(58) Field of Classification Search
  None
  See application file for complete search history.

(56) References Cited

U.S. PATENT DOCUMENTS

| 4,030,130 A | | 6/1977 | Smith |
| 4,152,736 A | * | 5/1979 | Jansen ............... G11B 5/59633 360/77.11 |
| 4,298,897 A | | 11/1981 | Arter et al. |
| 4,535,372 A | | 8/1985 | Yeakley |
| 4,622,601 A | | 11/1986 | Isozaki et al. |
| 4,646,168 A | | 2/1987 | Sonobe et al. |
| 4,771,346 A | | 9/1988 | Shoji et al. |
| 4,803,571 A | | 2/1989 | Fujioka et al. |
| 4,853,799 A | | 8/1989 | Aikawa |
| 4,903,151 A | * | 2/1990 | Mizukami ............ G11B 5/4886 360/61 |
| 5,010,430 A | | 4/1991 | Yamada et al. |

(Continued)

FOREIGN PATENT DOCUMENTS

| EP | 0484774 A2 | 5/1992 |
| EP | 1564736 | 8/2005 |

(Continued)

*Primary Examiner* — Wayne Young
*Assistant Examiner* — James L Habermehl
(74) *Attorney, Agent, or Firm* — Holzer Patel Drennan

(57) ABSTRACT

A storage device includes a multi-reader transducer head with a first reader and a second reader having an effective cross-track separation equal to a multiple of a defined track-pitch of a storage medium of the storage device. The effective cross-track separation may permit for a simultaneous data read of two non-adjacent data tracks.

19 Claims, 6 Drawing Sheets

(56) References Cited

U.S. PATENT DOCUMENTS

| | | |
|---|---|---|
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B2 | 3/2009 | Okamoto et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,139,318 B2 | 3/2012 | Biskeborn |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,922,947 B2 * | 12/2014 | Erden .................. G11B 5/5552 360/121 |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 * | 9/2015 | Edelman .............. G11B 5/4886 |
| 9,142,246 B1 | 9/2015 | Trantham et al. |
| 9,153,287 B1 | 10/2015 | Hamilton et al. |
| 9,324,362 B1 | 4/2016 | Gao |
| 9,396,062 B1 | 7/2016 | Sridhara et al. |
| 9,418,688 B1 | 8/2016 | Rausch et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2014/0327983 A1 | 11/2014 | Biskeborn et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | 02240862 A | 9/1990 |
| WO | 2005-030869 A1 | 4/2005 |

* cited by examiner

READER DESIGN FOR INTERLACED MAGNETIC RECORDING

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014, and also to U.S. Provisional Patent Application No. 62/097,416, entitled "Prioritized Random Access for Magnetic Recording" and filed on Dec. 29, 2014. Each of these applications is specifically incorporated by reference for all that it discloses or teaches.

BRIEF DESCRIPTIONS OF THE DRAWINGS

SUMMARY

Figure 1:
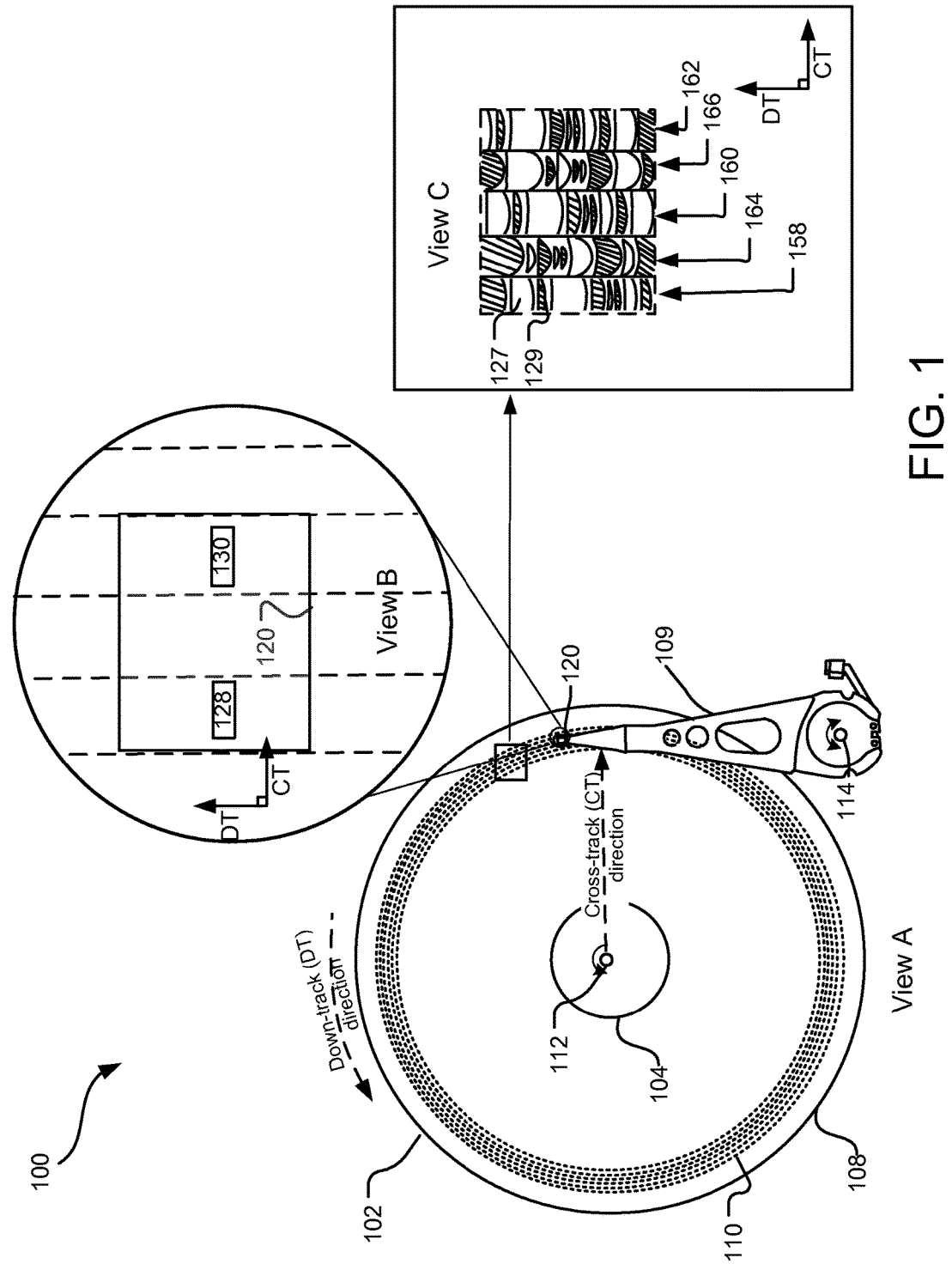
FIG. 1 illustrates a data storage device including a transducer head assembly with multiple readers for reading data from a magnetic storage medium.

According to one implementation, a storage device includes storage media including a plurality of data tracks having a defined track pitch. The storage device includes a transducer head having a first reader and a second reader with an effective cross-track separation that is an even integer multiple of the defined track pitch.

According to another implementation, the disclosed technology provides for a method for simultaneously reading two non-adjacent data tracks storing data of a continuous, consecutive logical block sequence.

According to yet another implementation, a storage device controller is configured to substantially align each of a first reader and a second reader with centers of one of two non-adjacent data tracks and to operate the first reader and the second reader to simultaneously read data from the two non-adjacent data tracks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

As requirements for area storage density increase for magnetic media, cell size decreases. A commensurate decrease in the size of a write element is difficult because in many systems, a strong write field is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is interlaced magnetic recording (IMR).

As explained in further detail with reference to the various figures below, IMR systems may utilize two or more selected written track widths and two or more different linear densities for data writes to alternating data tracks on a storage medium. In these systems, data tracks may be read from or written to the data tracks in a non-consecutive order. For example, data may be written exclusively to a first track series including every other data track in a region of a storage medium before data is written to any data tracks interlaced between the tracks of the first series.

IMR can allow for significantly higher areal recording densities than many existing data management systems. However, effective IMR systems are designed to implement prioritized write access rules that can, in some implementations, entail significant read/write overhead. For instance, modifying a target data track in an IMR system may entail reading two or more adjacent data tracks into memory, modifying the target data track, and re-writing the two or more adjacent data tracks. The herein-disclosed technology explores the convergence of IMR with two-dimensional magnetic recording (TDMR) to improve read/write performance in IMR systems. TDMR employs multiple dimensional data encoding and decoding to concurrently process multiple data tracks.

FIG. 1 illustrates an example data storage device 100 including a transducer head assembly 120 with multiple readers (e.g., readers 128 and 130) for reading data from a magnetic storage medium 108. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 112. The seek operation positions the transducer head assembly 120 over a target data track for read and write operations.

View B illustrates a magnified view of the transducer head assembly 120 relative to a number of data tracks. The transducer assembly 120 includes a pair of co-planar readers 128 and 130 positioned to substantially align with centers (e.g., an alignment to within +/−5% the track pitch) of corresponding, non-adjacent data tracks. In one implementation, track pitch on the magnetic storage medium 108 is calibrated as a function of skew angle of the transducer head assembly 120 (discussed in greater detail below with respect to FIG. 2).

View C illustrates a magnified view of a section of the magnetic storage medium 108 including polarized magnetic regions storing data according to an interlaced magnetic recording (IMR) technique. The polarized regions, also referred to herein as "data bits" (e.g., data bits 127, 129), each represent one or more individual data bits of a same state (e.g., is or Os). For example, the data bit 127 is a magnetically polarized region representing multiple bits of a first state (e.g., "000"), while the data bit 129 is an oppositely polarized region representing one or more bits of a second state (e.g., a single "1").

The illustrated IMR technique utilizes alternating data tracks of different written track widths arranged with slightly overlapping written track boundaries so that a center-to-center distance between directly adjacent tracks (e.g., the track pitch) is uniform across an area (e.g., a radial zone or across an entire surface of the magnetic storage medium 108). Specifically, View C illustrates a first series of alternating tracks (e.g., the tracks 158, 160, and 162) with a wider written track width than a second series of alternating data tracks (e.g., 164 and 166).

According to one implementation, each wide data track of the first series is written before the data is written to any directly-adjacent data tracks of the second series. For example, the data track 160 is written before data is written to either of the data tracks 164 and 166. Data writes to the data tracks 164 and 166 may subsequently overwrite outer edge portions of the data track 160; however, the data track 160 is still readable due to sufficient information retained in a center region of the data track 160. Because each data track of wide written track width is written prior to directly adjacent data tracks of narrower written track width, the data tracks of the wider written track width (e.g., data tracks 158, 160, and 162) are also referred to herein as "bottom tracks," while the alternating data tracks of narrower written width (e.g., the data tracks 164 and 166) are referred to herein as "top tracks."

In some implementations, the bottom tracks of wider written track width include data stored at a different linear density than one or more top tracks of narrower written track width. In still other implementations (e.g., on a bit-patterned media), the bottom and top data tracks are of equal written track width.

One consequence of IMR is that a bottom track (e.g., a data tracks 160) is not randomly writable when data is stored on a directly adjacent top data track (e.g., the data track 164 or 166). As used herein, a data track is "randomly writable" when the data track can be individually re-written multiple times without significantly degrading data on other adjacent data tracks. An adjacent data track is "significantly degraded" if reading the data track results in a number of read errors in excess of a maximum number of errors that can be corrected by a correction code (ECC) of the data storage device 100.

The above-described IMR data management techniques can be used to boost areal densities and reduce processing overhead as compared to some existing systems (e.g., such as shingled magnetic recording (SMR) systems). Performance gains of IMR systems can be enhanced further by utilizing the illustrated dual-reader design, which enables simultaneous reads of non-adjacent data tracks, as further detailed with respect to the following figures.

Figure 2:
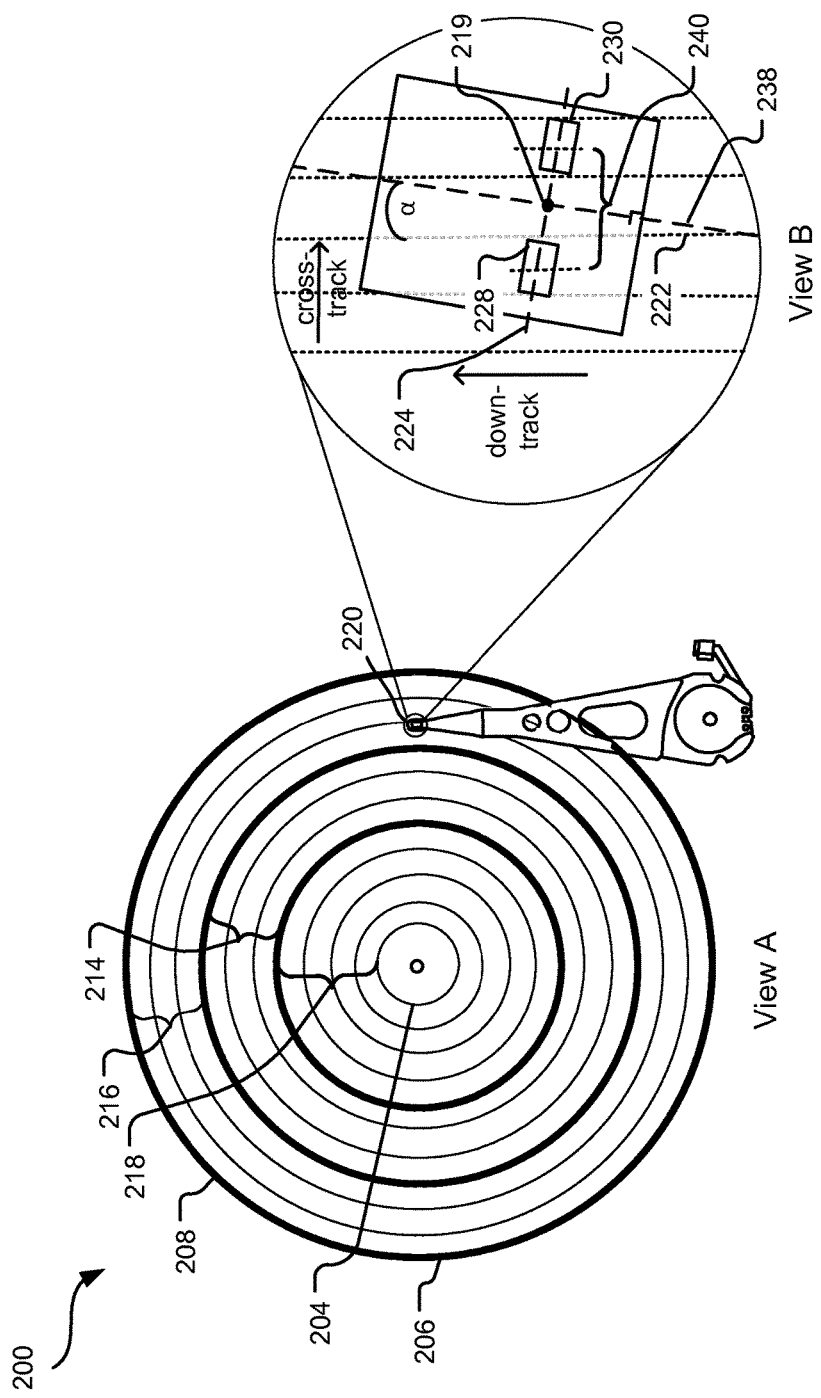
FIG. 2 illustrates an example data storage system including a transducer head assembly with a dual-reader design.

FIG. 2 illustrates another example data storage system 200 including a transducer head assembly 220 with a dual-reader design. As shown in View A, the data storage system 200 includes a storage medium 208 with a plurality of data tracks divided into different radial zones (e.g., radial zone 214, 216, and 218). Track pitch is constant within each radial zone but is variable between the different radial zones. Although FIG. 2 illustrates three radial zones, it should be understood that some implementations may implement a much greater number of radial zones, such as more than one hundred.

View B shows an exploded view of the transducer head assembly 220 including two readers 228 and 230. The readers 228 and 230 are co-planar and equidistant from a point 219 centered between the two readers 228 and 230 along a lateral axis 218. At some radial locations, a longitudinal axis 238 of the transducer head assembly 220 is angled relative to a target data track 222 (e.g., by an angle α, as shown). This angle is commonly referred to as the skew angle.

In the data storage system 200 of FIG. 2, the skew angle is of a largest negative value at the inner diameter (e.g., within the radial zone 218), increases to zero within a middle diameter region (e.g., within the radial zone 214), and continues to increase to a largest positive value at the outer diameter (e.g., within the radial zone 216).

In one implementation, track pitch on the storage medium 208 is calibrated as a function of skew angle of the transducer head assembly 220. Consequently, radial zones of larger track pitch correspond to regions where the magnitude of the skew angle is low and radial zones with a smaller defined track pitch correspond to regions where the magnitude of the skew angle is high. For example, a defined track pitch is larger within the radial zone 214 where the skew angle is near-zero and smaller within the radial zones 218 and 216 where the magnitude of the skew angle is higher.

An effective cross-track separation 240 (e.g., separation measured in a cross track direction) between the readers 228 and 230 is given by $N \times Cos(\alpha)$, where N is the separation between the readers 228 and 230 along the lateral axis 224, and α is the skew angle. The effective cross-track separation 240 of the readers 228 and 230 changes with the skew angle but also changes in proportion to the track pitch that is variable across the different radial zones. As a result, the readers 228 and 230 are always centered over non-adjacent data tracks regardless of the skew angle of the transducer head assembly 220.

In FIG. 2, the effective cross-track separation 240 is, at any given position of the transducer head assembly 220, equal to twice the track pitch of the underlying data tracks. However, different separations between the readers 228 and 230 are employed in other implementations and reader separation may be set such that the effective cross-track separation 240 is, at any given position of the transducer head assembly 220, equal to any predetermined multiple of the track pitch of the underlying data tracks.

In effect, the illustrated dual-reader design provides for a simultaneous read of two non-adjacent data tracks that is immune to skew angle misalignment. As discussed in greater detail below, this design may significantly improve read and write performance in storage devices utilizing IMR storage techniques.

Figure 3:
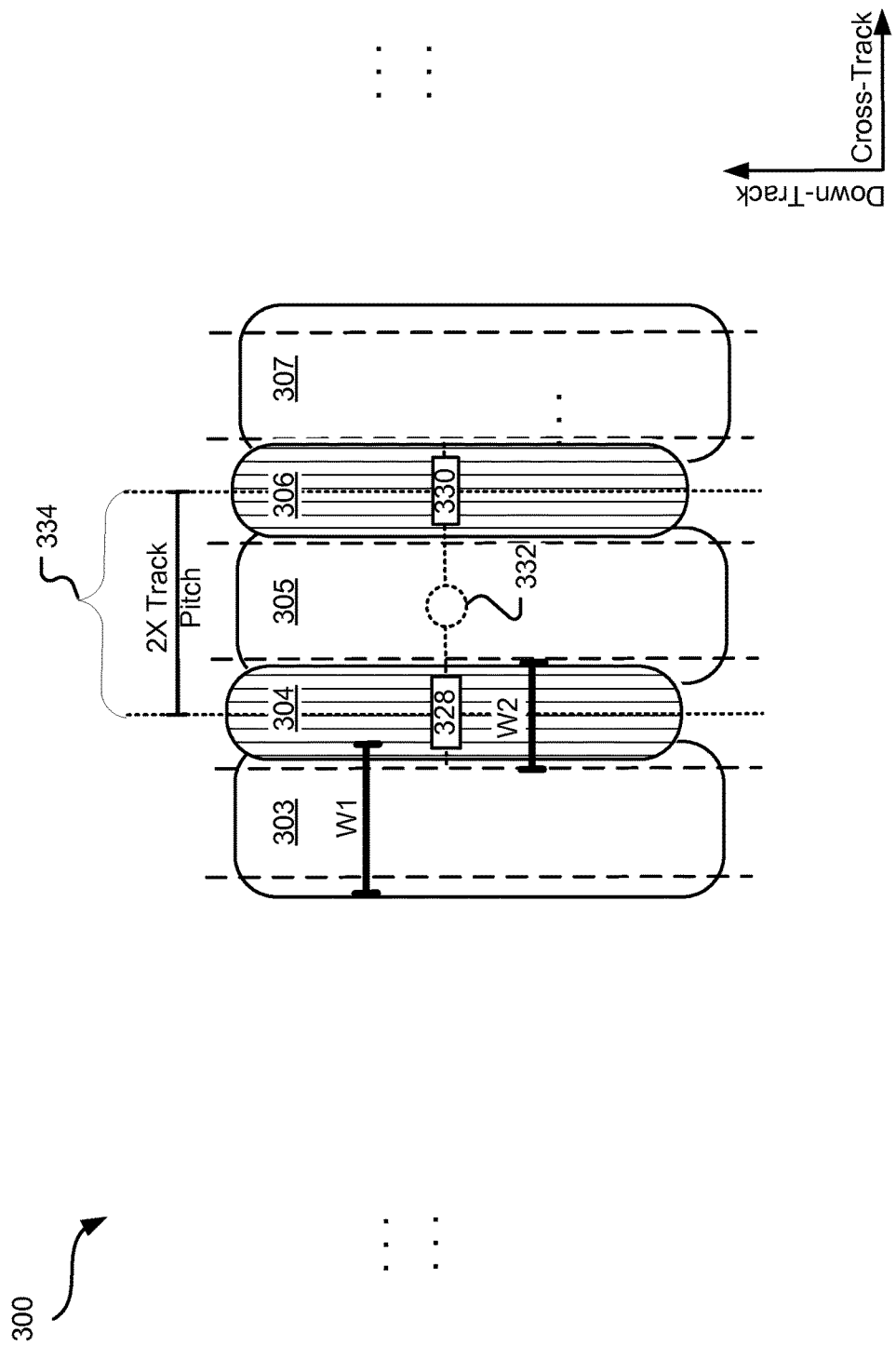
FIG. 3 illustrates a simultaneous read of non-adjacent data tracks in an example storage device storing data.

FIG. 3 illustrates a simultaneous read of non-adjacent data tracks in another example storage device 300 storing data according to an IMR storage technique. The storage device 300 includes a magnetic media including consecutive data tracks 303, 304, 305, 306, and 307. Although a track pitch may vary between different radial zones on the magnetic media, each of the illustrated data tracks 303-307 has a same track pitch. The storage device 300 further includes a transducer head assembly (not shown) supporting two readers 328 and 330 that are positioned symmetrically about a pivot point 332 that serves as the center of rotation for the transducer head assembly.

The two readers 328 and 330 each have an effective cross-track separation 334 equal to twice the track pitch of the underlying data tracks. Consequently, centers of the readers 328 and 330 each substantially align with centers of the underlying data tracks 304 and 306.

The alternating tracks of the consecutive data tracks 303-307 store data at two different written track widths. "Bottom" data tracks 303, 305, and 307 have a wider written track width (W1) than a written width (W2) of interlaced "top" data tracks 304 and 306. In other implementations, such as those utilizing IMR in conjunction with bit patterned media (BPM), written track width may be fixed across the surface of the storage media.

In one implementation, a controller of the storage device 300 directs incoming new data exclusively to the series of bottom data tracks 303, 305, and 307 before directing any data writes the top data tracks 304 and 306. For example, a storage device controller may direct new data writes to a consecutive sequence of bottom data tracks until a capacity condition is satisfied. The capacity condition may be satisfied when, for example, a threshold number of data tracks store data or when a capacity of stored data exceeds a predetermined threshold condition.

In one implementation where consecutive data writes are directed exclusively to the series of bottom data tracks 303, 305, 307 for a period of time, the consecutive bottom data tracks 303, 305, and 307 correspond to a continuous, consecutive sequence of LBAs. For example, a file spanning LBAs 100-299 may be spread across adjacent bottom data tracks 303 and 305, where no data of the file is stored on the interlaced data track 304. In particular, LBAs 100-199 may be stored on the data track 303 and LBAs 200-299 may be stored on the data track 305. In the event that a user file is stored in two or more adjacent bottom tracks, the illustrated dual reader design reduces execution time of a read request of the file by permitting a simultaneous read of the consecutive adjacent bottom tracks (e.g., the data tracks 303 and 305).

As detailed below, the dual-reader design may also facilitate execution of certain types of write operations. In the above-described implementation, the storage device controller may eventually begin directing writes of new data to the interlaced tracks (e.g., the top tracks 304 and 306), such as after satisfaction of a capacity condition. The subsequent data writes to the top data tracks 304 and 306 effectively "trim" edges of adjacent bottom data tracks 303, 305, and 307. Each of the top (e.g., narrower) written data tracks overwrite the edge portions of data in the adjacent bottom (e.g., wider) written data tracks but a readable portion of the data of the wider written tracks is retained in the center region of each of the wider written data tracks.

According to one implementation, the illustrated top data tracks 304 and 306 are each randomly writeable; however, the bottom data tracks 303, 305, and 307 are not randomly writable when they are bounded by one or more data-storing tracks, as shown. Therefore, re-writing the bottom data track 305 may entail the following operations in the following order: (1) reading the immediately adjacent top data tracks 304 and 306 into a memory location; (2) writing the new data to the bottom data track 305; and (3) subsequently writing data to the top data tracks 304 and 306 from the memory location. The illustrated dual reader design reduces a total time of the above-described write operation by permitting a simultaneous read of the top data tracks 304 and 306 during a single revolution of the storage medium.

In some implementations, the top data tracks 304 and 306 are written to in a consecutive order. For example, consecutive top data tracks may correspond to a continuous, consecutive LBA sequence. In other implementations, consecutive top data tracks may correspond to a non-consecutive LBA sequence. Although the dual-reader design of FIG. 3 (e.g., separation equaling 2× the track pitch) is useful in some implementations, other reader designs may be selected for integration into different storage devices based on a particular, implemented write management scheme utilized within each device. One of many additional example multi-reader designs is discussed with respect to FIG. 4.

Figure 4:
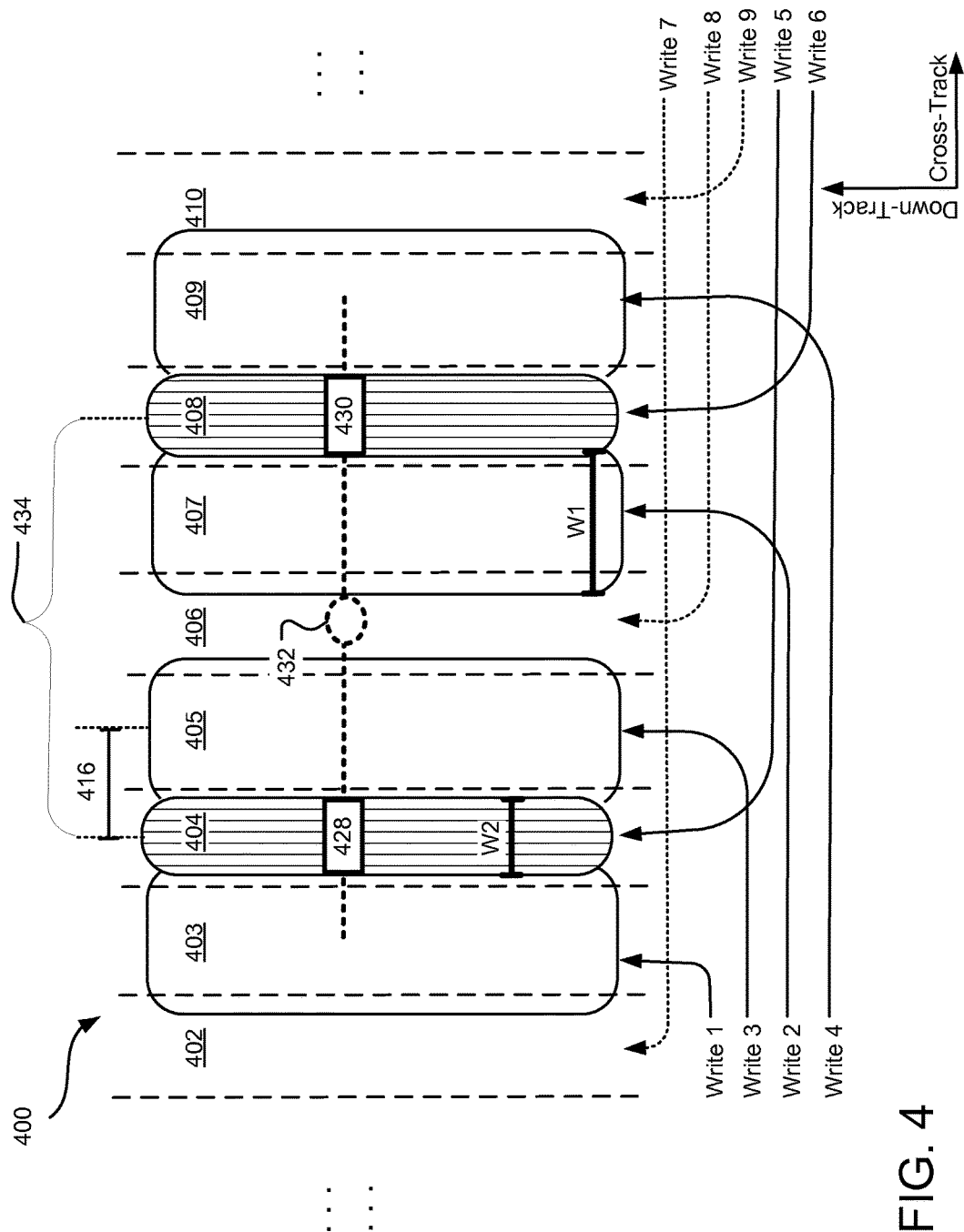
FIG. 4 illustrates a simultaneous read of non-adjacent data tracks in another example storage device.

FIG. 4 illustrates a simultaneous read of non-adjacent data tracks in another example storage device 400. The storage device 400 includes a magnetic media including consecutive data tracks 402-410. Although a track pitch may vary between different radial zones on the magnetic media, each of the illustrated data tracks 402-410 have a same track pitch 416. The storage device 400 further includes a transducer head assembly (not shown) which supports two readers 428 and 430 positioned symmetrically about a pivot point 432 that serves as the center of rotation for the transducer head assembly.

In FIG. 4, the track pitch 416 of each data track is smaller than a written track width (W1) of a first plurality of alternating data tracks 403, 405, 407, and 409 (e.g., "bottom tracks"). Tracks interlaced with the first plurality of alternating data tracks (e.g., "top tracks" 402, 404, 406, 408, and 410) have a written track width (W2) that is equal to or slightly less than the track pitch 416. In other implementations, such as those utilizing IMR in conjunction with bit patterned media (BPM), written track width may be fixed across the surface of the storage media.

A controller of the storage device 400 implements a write management scheme to ensure that groupings of adjacent data tracks are written in an order such that data of all tracks are readable and a total read/write processing time is mitigated. The prioritized write access scheme may govern data writes to an entire magnetic disc, or (alternatively) govern data writes to a subset of a magnetic disc, such as a radial zone or a partitioned storage area of the magnetic disc.

According to one implementation, the write management scheme includes multiple phases, with different write prioritization rules applied during each distinct phase. In a first phase of the write management scheme, data is written exclusively to alternating tracks. In some implementations, consecutive bottom data tracks are written to in a consecutive order. In FIG. 4, however, consecutive bottom data tracks are not written to in a consecutive order. Rather, data writes to a continuous, consecutive sequence of LBAs are directed to every other bottom data track (e.g., every fourth data track). For example, the bottom data tracks (e.g., 403, 407, 405, and 409) with a wide written track width may be written to non-sequentially, as illustrated by the notation "Write 1", "Write 2", "Write 3," and "Write 4" in FIG. 4. This first phase continues until a first capacity condition is satisfied. For example, the first capacity condition may be satisfied when 50% of the data tracks in a region (e.g., a specific radial or zone or the entire disc surface) store data. During this first phase of the data management method, each of the bottom data tracks (e.g., 403, 405, 407, 409, etc.) can be written to at random and directly overwritten without re-writing any data of adjacent data tracks.

After the first capacity condition is satisfied, a second phase of the write management scheme commences and the controller begins to direct new incoming data to the top data tracks (e.g., 402, 404, 406, 408, etc.). In some implementations, consecutive top data tracks are written to in a consecutive order. In FIG. 4, however, consecutive top data tracks are (like the bottom data tracks) written to in a non-consecutive order. Data writes to a continuous, consecutive sequence of LBAs are directed to every other top data track (e.g., every fourth data track), as indicated by "Write 5" on data track 404 and "Write 6" on data track 408. By writing data to alternating top data tracks (e.g., 404, 408 and skipping over 406), the storage device can avoid reading/re-writing more than two data tracks in a single track write for a period of time as the storage media fills up. For example, overwriting the data track 403 during the second phase of the write management scheme entails (1) reading data track 404 to a temporary cache location; (2) writing the data track 403; and (3) re-writing the data track 404 after the write of data track 403 is complete.

When a second capacity condition is satisfied, a third phase of the data management method commences and the controller begins to direct incoming data to the remaining un-filled data tracks, as indicated by the notation "Write 7," "Write 8," and "Write 9" in FIG. 4. For example, the second capacity condition may be satisfied once data is stored on 75% of the data tracks on the magnetic media or on 75% of the data tracks within a select radial zone. During the third phase of the write management scheme, a single track write may entail reading two data tracks and writing three data tracks. For example, overwriting the data tracks 403 during the third phase of the write management scheme entails (1) reading data tracks 402 and 404 into a temporary cache location; (2) writing the data track 403; and (3) re-writing the data tracks 402 and 404 after the write of data track 403 is complete.

One benefit of this multi-phase write management scheme is that many storage drives may never be used in the third phase. For example, the average usage capacity of desktop hard drives may be between about 50% and 60%, allowing the storage drive to operate exclusively in the first and second phases of the write management scheme. Therefore, the multi-phase write management scheme greatly enhances performance in these systems as compared to systems using other types of data management systems, such as shingled magnetic recording.

In the above-described three-phase write scheme, a continuous, consecutive sequence of LBAs may correspond to each pair of data tracks separated by three interlaced data tracks. For example, data of a consecutive LBA sequence may be found on any of the following pairs of tracks 403 and 407; 405 and 409; and/or 404 and 408. Accordingly, there may be instances when it is time-efficient to simultaneous read two non-adjacent data tracks separated by three interlaced tracks. To allow for this, the illustrated two readers 428 and 430 of the storage device 400 each have an effective cross-track separation 434 that is four times the track pitch of the underlying data track (e.g., 404 and 408).

In other implementations (not shown), the readers 428 and 430 have an effective cross-track separation 434 substantially equal to another integer multiple of the track pitch of the underlying data tracks. This may be useful to implement higher levels of interlaced magnetic recording. If, for example, the storage device maps a continuous, consecutive LBA sequence to a consecutive series of data tracks including every eighth data track on the storage medium, the readers 428 and 430 may have an effective cross-track separation 434 that is eight times the track pitch of the underlying data tracks. If, alternatively, the storage device maps a continuous, consecutive LBA sequence to a consecutive series of data tracks including every $16^{th}$ data track on the storage medium, the readers 428 and 430 may have an effective cross-track separation 434 that is substantially 16 times the track pitch of the underlying data tracks. Still other implementations employ other effective cross-track reader separations equal to any 'n' integer multiple of the track pitch.

Figure 5:
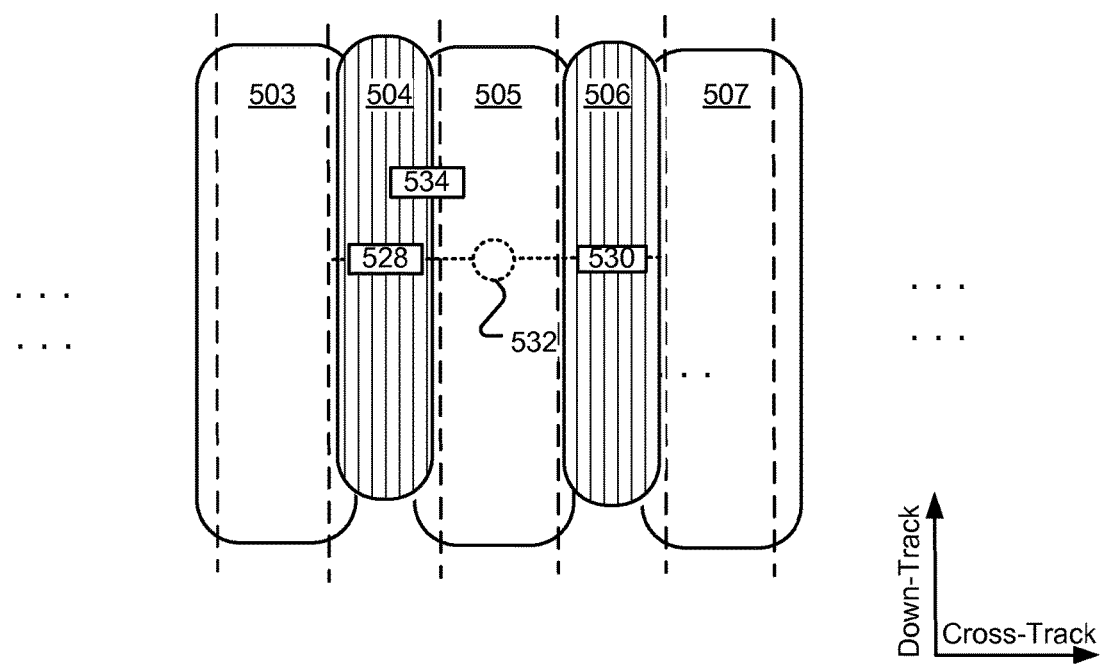
FIG. 5 illustrates a simultaneous read of non-adjacent data tracks in another example storage device storing data.

FIG. 5 illustrates a simultaneous read of non-adjacent data tracks in another example storage device 500 storing data according to an IMR storage technique. The storage device 500 includes a magnetic media including consecutive data tracks 503, 504, 505, 506, and 507. The storage device 500 further includes a transducer head assembly (not shown) supporting a first reader 528, a second reader 530, and a third reader 534. The first reader 528 and the second reader 530 are positioned symmetrically about a pivot point 532 that serves as the center of rotation for the transducer head assembly. An effective cross-track separation of the first reader 528 and the second reader 530 is equal to an integer multiple of the track pitch (e.g., twice the track pitch).

The third reader 534 is shown down-track from the first reader 528, and slightly offset from the first reader 528 in the cross-track direction. The third reader 534 reads a same data track as the first reader 528 (e.g., a data track 504) and helps to improve signal to noise of the data from the data track as compared to an implementation not including the third reader 534. In some implementations, a fourth reader (not shown) is similarly offset from the second reader 530 in order to improve SNR of data read from another corresponding data track (e.g., the data track 506). However, using three readers instead of four may help to reduce head manufacturing costs and power consumption without a significant performance decrease.

Figure 6:
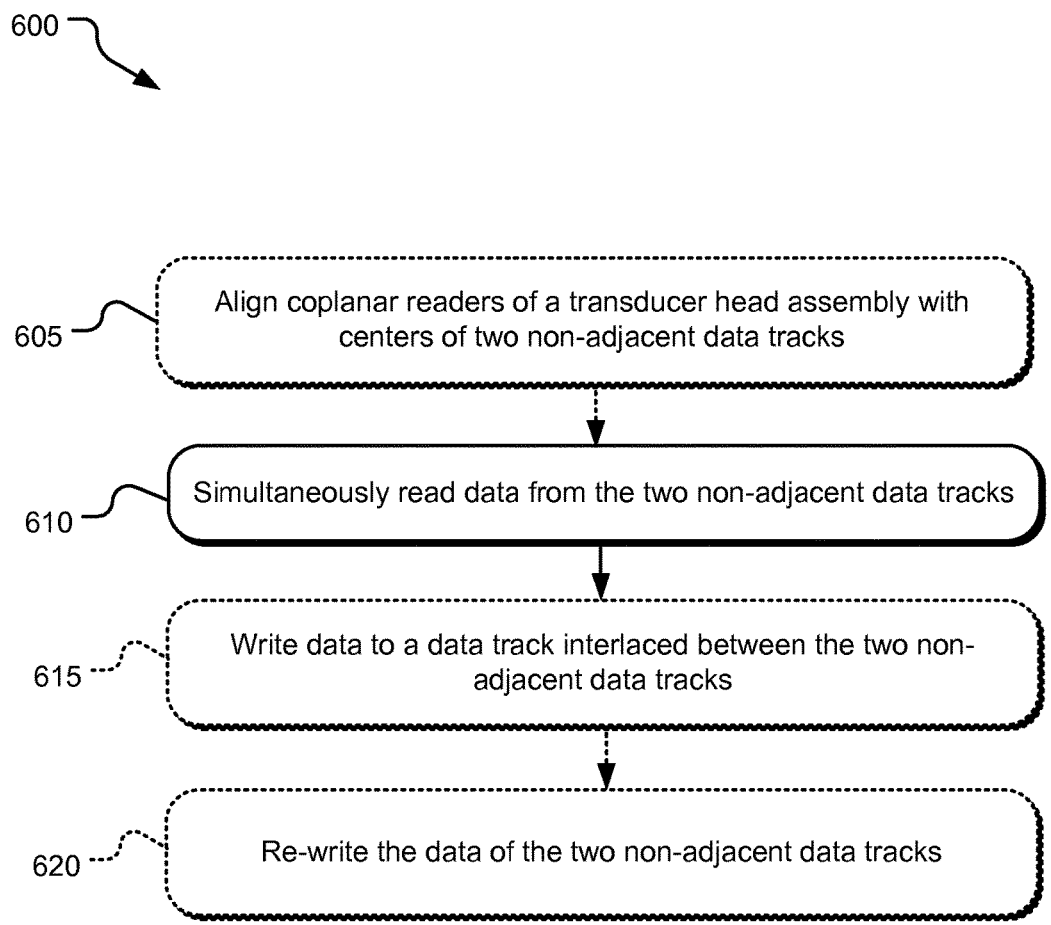
FIG. 6 illustrates example operations for reading data from non-adjacent data tracks in a storage device implementing interlaced magnetic recording (IMR) storage techniques.

FIG. 6 illustrates example operations 600 for data management in a storage device implementing an IMR storage technique. An alignment operation 605 aligns a transducer head assembly with underlying data tracks of a storage medium such that two co-planar readers of the transducer head assembly substantially align with centers of non-adjacent data tracks on the storage medium. A reading operation 610 simultaneously reads data from the two non-adjacent data tracks during a single rotation of the storage medium below the transducer head assembly. According to one implementation, the two non-adjacent data tracks store data of a continuous, consecutive LBA sequence. For example, the non-adjacent data tracks may include a first data track storing LBAs 0-99 and a second data track storing LBAs 100-199.

In some implementations, the simultaneous reading operation 610 reads data of the two non-adjacent data tracks into a temporary cache location, while a write operation 615 writes data to at least one data track interlaced between the two non-adjacent data tracks. After the write operation 615, a re-write operation 620 may re-write the data to the two non-adjacent data tracks from the temporary memory buffer.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
   a storage media including a plurality of data tracks having a defined track pitch; and
   a transducer head including a first reader and a second reader with an effective cross-track separation that is an even integer multiple of the defined track pitch; and
   a controller configured to:
      operate the first reader and the second reader to simultaneously read data of two non-adjacent data tracks into a temporary memory buffer; and
      store the read data within the temporary memory buffer while writing new data to at least one interlaced data track between the two non-adjacent data tracks.

2. The apparatus of claim 1, wherein the effective cross-track separation is equal to twice the defined track pitch.

3. The apparatus of claim 1, wherein the effective cross-track separation is equal to four times the track pitch.

4. The apparatus of claim 1, wherein the plurality of data tracks correspond to a logical block address (LBA) sequence and the first reader and the second reader are configured to simultaneously read non-adjacent data tracks corresponding to a continuous, consecutive portion of the LBA sequence.

5. The apparatus of claim 1, wherein the first reader and the second reader are positioned symmetrically about a center of rotation of the transducer head.

6. The apparatus of claim 1, wherein the first reader and the second reader are co-planar.

7. The apparatus of claim 1, wherein the transducer head further comprises:
   a third reader configured read data from a same data track as the first reader, the third reader positioned down-track from the first reader and offset from the first reader in the cross-track direction.

8. A method comprising:
   simultaneously reading two non-adjacent data tracks storing data of a continuous, consecutive LBA sequence.

9. The method of claim 8, wherein the data of the two non-adjacent data tracks is read into a temporary memory buffer and the method further comprises:
   writing data to at least one interlaced data track between the two non-adjacent data tracks.

10. The method of claim 9, further comprising:
    re-writing data of the two non-adjacent data tracks from the temporary memory buffer.

11. The method of claim 8, wherein the two non-adjacent data tracks are separated by a single interlaced data track.

12. The method of claim 8, wherein the two non-adjacent data tracks are separated by three interlaced data tracks.

13. The method of claim 8, wherein the non-adjacent data tracks are read by two readers positioned symmetrically about a center of rotation of a transducer head.

14. The method of claim 13, wherein the two readers are co-planar.

15. Apparatus comprising:
    a storage device controller configured to substantially align each of a first reader and a second reader with a center of one of two non-adjacent data tracks and to operate the first reader and the second reader to simultaneously read data from the two non-adjacent data tracks, a first data track of the two non-adjacent data tracks storing data corresponding to a first portion of a continuous, consecutive LBA sequence and a second data track of the two non-adjacent data tracks storing data corresponding to a second consecutive portion of the continuous, consecutive LBA sequence.

16. The apparatus of claim 15, wherein the first reader and the second reader have an effective cross-track separation equal to twice a defined track pitch of the storage device.

17. The apparatus of claim 15, wherein the first reader and the second reader have an effective cross-track separation equal to four times a track pitch of the storage device.

18. The apparatus of claim 15, wherein the first reader and the second reader are positioned symmetrically about a center of rotation of the transducer head.

19. The apparatus of claim 15, wherein the first reader and the second reader are co-planar.

* * * * *